US009473336B2

(12) United States Patent
Pan et al.

(10) Patent No.: US 9,473,336 B2
(45) Date of Patent: Oct. 18, 2016

(54) RADIO FREQUENCY (RF) FRONT END HAVING MULTIPLE LOW NOISE AMPLIFIER MODULES

(71) Applicant: QUALCOMM Incorporated, San Diego, CA (US)

(72) Inventors: Dongling Pan, San Diego, CA (US); Aleksandar Miodrag Tasic, San Diego, CA (US); Rajagopalan Rangarajan, San Diego, CA (US); Lai Kan Leung, San Marcos, CA (US); Chiewcharn Narathong, Laguna Niguel, CA (US); Yiwu Tang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/671,939

(22) Filed: Mar. 27, 2015

(65) Prior Publication Data

US 2015/0333941 A1    Nov. 19, 2015

Related U.S. Application Data

(60) Provisional application No. 61/994,158, filed on May 16, 2014.

(51) Int. Cl.
| | |
|---|---|
| *H04B 7/00* | (2006.01) |
| *H04L 27/06* | (2006.01) |
| *H04B 1/10* | (2006.01) |
| *H04B 7/26* | (2006.01) |
| *H04B 1/00* | (2006.01) |

(52) U.S. Cl.
CPC ............ *H04L 27/063* (2013.01); *H04B 1/005* (2013.01); *H04B 1/10* (2013.01); *H04B 7/26* (2013.01)

(58) Field of Classification Search
CPC ..................................................... H04L 27/063
USPC ............................................... 455/257, 232.1
See application file for complete search history.

(56) References Cited

U.S. PATENT DOCUMENTS

| | | | | |
|---|---|---|---|---|
| 4,054,842 | A * | 10/1977 | Elliott | H04L 27/148 329/300 |
| 7,349,488 | B1 * | 3/2008 | Margolese | H04L 27/02 332/100 |
| 8,532,588 | B1 | 9/2013 | Weber et al. | |
| 9,136,811 | B2 * | 9/2015 | Bhardwaj | H03G 3/3036 |
| 2006/0068746 | A1 | 3/2006 | Feng et al. | |
| 2009/0088124 | A1 | 4/2009 | Schuur et al. | |
| 2013/0230080 | A1 | 9/2013 | Gudem et al. | |
| 2013/0231064 | A1 | 9/2013 | Gudem et al. | |
| 2014/0134959 | A1 | 5/2014 | Tasic et al. | |
| 2014/0134960 | A1 | 5/2014 | Tasic et al. | |

OTHER PUBLICATIONS

International Search Report and Written Opinion—PCT/US2015/029966—ISA/EPO—Jul. 20, 2015, 9 pages.

* cited by examiner

*Primary Examiner* — Sanh Phu
(74) *Attorney, Agent, or Firm* — Toler Law Group, PC (57) ABSTRACT

A radio frequency (RF) front end having multiple low noise amplifiers modules is disclosed. In an exemplary embodiment, an apparatus includes at least one first stage amplifier configured to amplify received carrier signals to generate at least one first stage carrier group. Each first stage carrier group includes a respective portion of the carrier signals. The apparatus also includes second stage amplifiers configured to amplify the first stage carrier groups. Each second stage amplifier configured to amplify a respective first stage carrier group to generate two second stage output signals that may be output to different demodulation stages where each demodulation stage demodulates a selected carrier signal.

20 Claims, 8 Drawing Sheets

RADIO FREQUENCY (RF) FRONT END HAVING MULTIPLE LOW NOISE AMPLIFIER MODULES

CLAIM OF PRIORITY UNDER 35 U.S.C. §119

The present application for patent claims priority to U.S. Provisional application having Application No. 61/994,158, entitled "RADIO FREQUENCY (RF) FRONT END HAVING MULTIPLE LOW NOISE AMPLIFIER MODULES" filed May 16, 2014, assigned to the assignee hereof and expressly incorporated herein by reference.

BACKGROUND

I. Field

The present disclosure relates generally to communication transceivers, and more specifically, to a receiver front end for use in carrier aggregation communication systems.

II. Background

In a radio frequency (RF) transceiver, a communication signal is developed, upconverted, amplified and transmitted by a transmitter and is received, amplified, downconverted and recovered by a receiver. In the receiver, the communication signal is typically received and downconverted by receive circuitry to recover the information contained in the communication signal. A single transmitter or receiver can be configured to operate using multiple transmit frequencies and/or multiple receive frequencies. For a receiver to be able to simultaneously receive two or more receive signals, the concurrent operation of two or more receive paths is used. Such systems are sometimes referred to as "carrier-aggregation" (CA) systems. The term "carrier-aggregation" may refer to systems that include inter-band carrier aggregation (Inter-CA) and intra-band carrier aggregation (Intra-CA). Inter-CA refers to the processing of two or more separate (either contiguous or non-contiguous) carrier signals that occur in different communication bands. Intra-CA refers to the processing of two or more separate (either contiguous or non-contiguous) carrier signals that occur in the same communication band. A received carrier aggregated RF signal is typically amplified and down-converted using one or more distinct local oscillator (LO) frequencies. The downconverted signals are then processed to extract the information transmitted using the multiple carriers.

Communication devices have RF transceivers that are becoming more and more complex as they are designed to handle an ever-increasing number of different frequencies in multiple communication bands. It is common for a communication device to be able to communicate over a variety of different frequencies over many different communication bands. In many cases, the receiver includes multiple signal paths that give rise to stringent path-to-path isolation requirements because each receiver signal path could generate aggressor signals to other receiver signal paths. When an internal aggressor signal is present on a victim receiver path, a large amount of receiver desensitization can occur due to circuit nonlinearities and/or other external interferers. This makes recovery of the information on the victim receiver path difficult or impossible.

It is therefore desirable to have way to provide improved receiver path isolation when receiving multiple carrier signals in a carrier aggregation transceiver.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Figure 1:
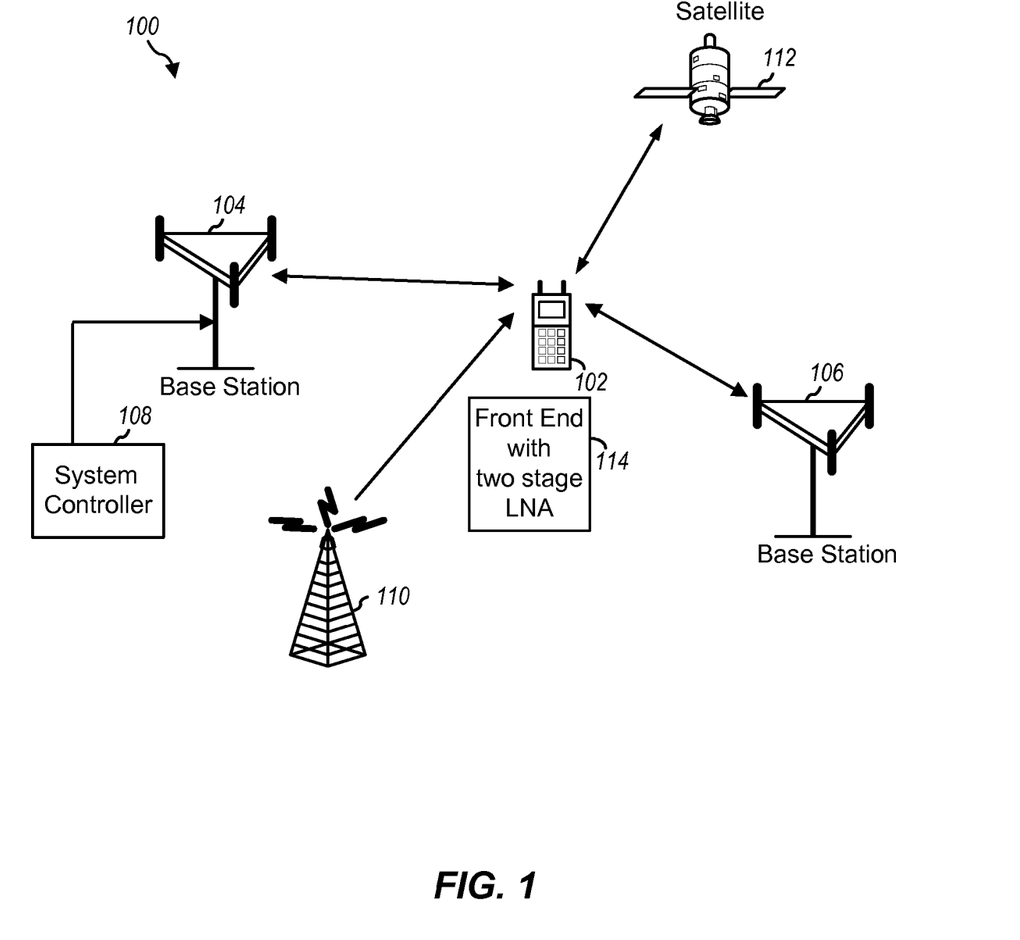
FIG. 1 shows an exemplary embodiment of a front end having a two stage LNA that efficiently routes received RF signals in multiple communication bands to demodulators in a wireless device communicating within a wireless system.

FIG. 1 shows an exemplary embodiment of a front end 114 having a two stage low noise amplifier (LNA) that efficiently routes received RF carrier signals in multiple communication bands to demodulators in a wireless device 102 communicating within a wireless system 100. Wireless system 100 may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA. For simplicity, FIG. 1 shows wireless system 100 including two base stations 104 and 106 and one system controller 108. In general, wireless system 100 may include any number of base stations and any set of network entities.

Wireless device 102 may also be referred to as a user equipment (UE), a mobile station, a terminal, an access terminal, a subscriber unit, or a station. Wireless device 102 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, or other communicating device. Wireless device 102 may communicate with devices in the wireless system 100. Wireless device 102 may also receive signals from broadcast stations (e.g., a broadcast station 110), or signals from satellites (e.g., a satellite 112) in one or more global navigation satellite systems (GNSS). Wireless device 102 may support one or more radio technologies for wireless communication such as LTE, WCDMA, CDMA 1X, EVDO, TD-SCDMA, GSM, 802.11. In various exemplary embodiments, the two stage LNA of the front end 114 efficiently routes received carriers in one or multiple communication bands to corresponding demodulators to obtain the desired baseband signals. In various exemplary embodiments, the two stage LNA operates to provide improved receiver path isolation and consistent receiver performance when processing different carrier signals in one or multiple communication bands.

Figure 2:
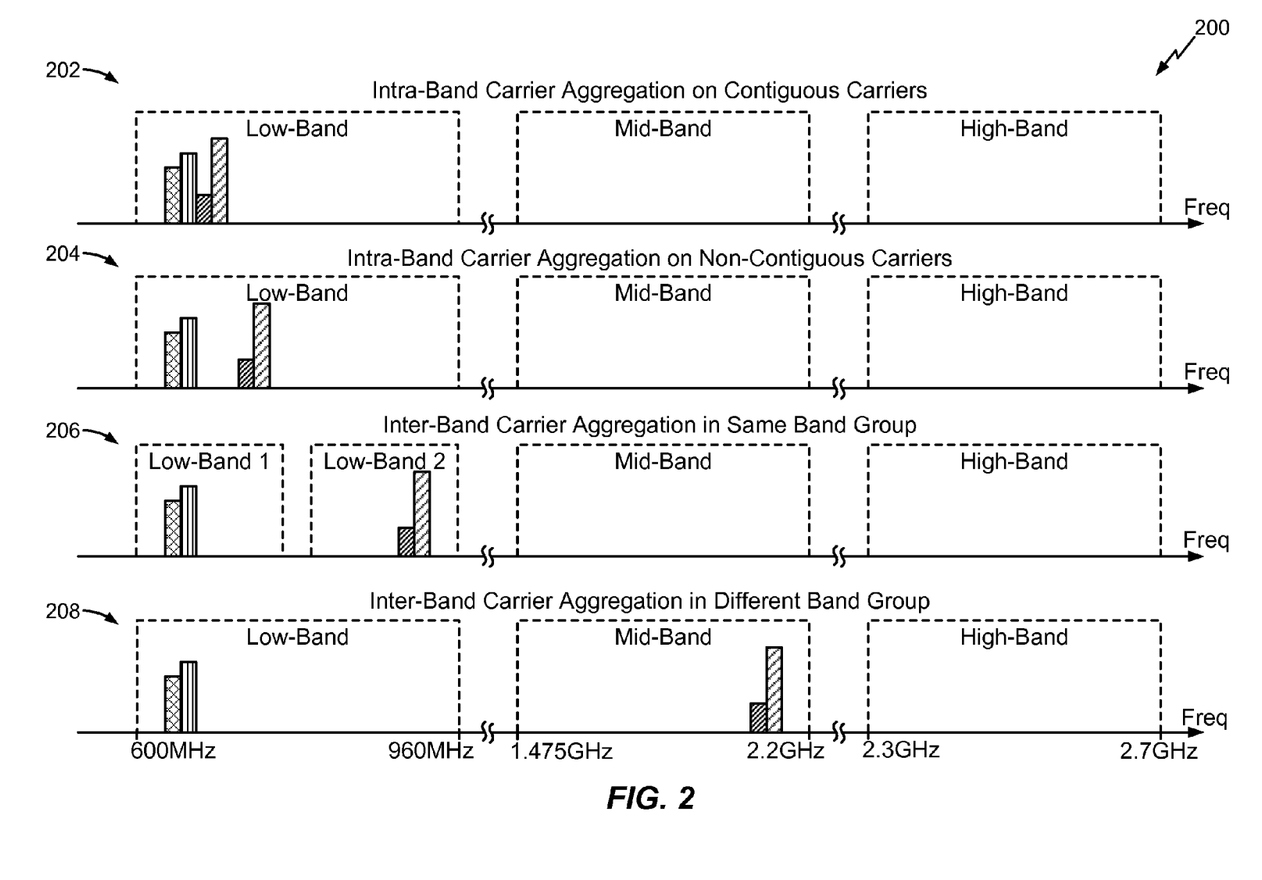
FIG. 2 shows diagrams that illustrate exemplary carrier signal configurations in a carrier aggregation communication system.

FIG. 2 shows diagrams 200 that illustrate exemplary signal carrier configurations in a carrier aggregation communication system. For example, the signal configurations show signal bands in which RF carriers may be transmitted or received in the communication system 100 shown in FIG. 1. For example, the diagrams 200 show low-band, mid-band and high-band groups and each band group may have one or more signal bands that comprise one or more carrier signals. In diagram 206, the low-band group is further divided into two low band groups.

Diagram 202 shows an illustration of a contiguous intra-band carrier configuration. For example, there are multiple contiguous carriers in one band group (e.g., four contiguous carriers in the low-band group). Wireless device 100 may send and/or receive transmissions on the four contiguous carriers within the same band group.

Diagram 204 shows an illustration of a non-contiguous intra-band carrier configuration. For example, there are multiple non-contiguous carriers in one band group (e.g., four non-contiguous carriers in the low-band group). The carriers may be separated by 5 MHZ, 10 MHz, or some other amount. Wireless device 100 may send and/or receive transmissions on the four non-contiguous carriers within the same band group.

Diagram 206 shows an illustration of an inter-band carrier configuration using the same band group. For example, there are multiple carriers in two bands (e.g., two contiguous carriers in low band 1 and two contiguous carriers in low-band 2). Wireless device 100 may send and/or receive transmissions on the four carriers in different bands in the same band group, Diagram 208 shows an illustration of an inter-band carrier configuration using different band groups. For example, there are multiple carriers in two bands of different band groups (e.g., two carriers in the low-band group and two carriers in the mid-band group. Wireless device 100 may send and/or receive transmissions on the four carriers in the different band groups. It should also be noted that other carrier configurations using different band groups are also supported by the exemplary embodiments.

Figure 3:
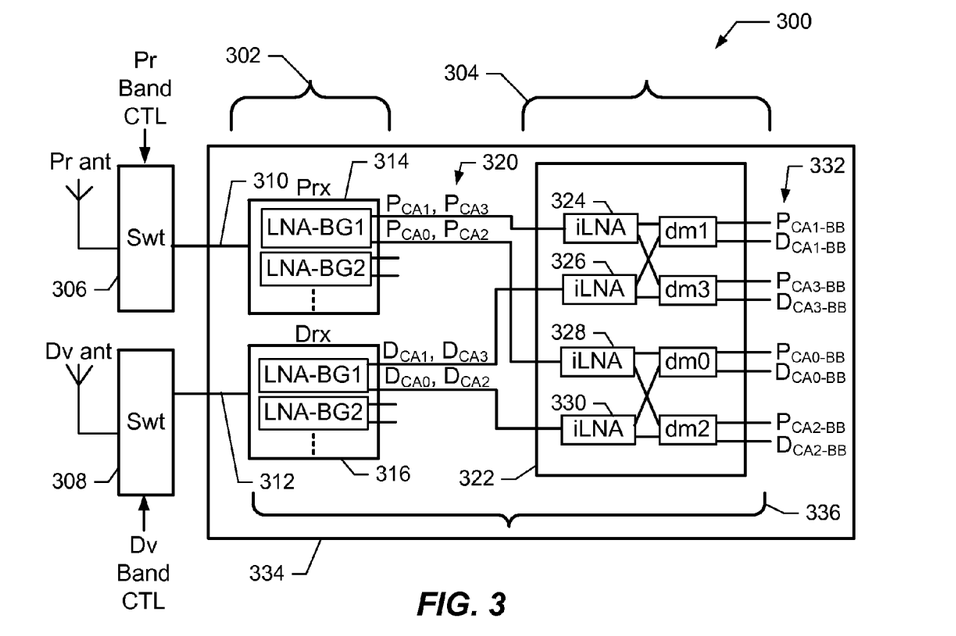
FIG. 3 shows a block diagram of a receiver front end that comprises an exemplary embodiment of a two stage LNA.

FIG. 3 shows a block diagram of a receiver front end 300 that comprises an exemplary embodiment of a two stage LNA 336. For example, the front end 300 is suitable for use as the front end 114 shown in FIG. 1. The two stage LNA 336 comprises a first amplification stage 302 and a second amplification stage 304.

The front end 300 connects to a primary (Pr) antenna that receives RF signals that are input to a first switch 306. The front end 300 also connects to a diversity (Dv) antenna that receives RF signals that are input to a second switch 308. The switches 306 and 308 perform switching and filtering on the RF signals at their inputs to output signals having selected carrier signals in selected bands and/or band groups. In an exemplary embodiment, the switch 306 receives a primary band control signal that controls the switching and filtering provided by the switch 306 so that selected carrier signals in selected primary bands and/or band groups are output from the switch 306. Likewise, the switch 308 receives a diversity band control signal that controls the switching and filtering provided by the switch 308 so that selected carrier signals in selected diversity bands and/or band groups are output from the switch 308. The primary and diversity band control signals are provided by another entity at the device, such as a baseband processor.

For the purpose of this description, it will be assumed that the front end 300 is to receive and process carrier signals having the carrier configuration 208 shown in FIG. 2. Thus, there are four carrier signals in two different band groups (e.g., Low band and Mid band) to be received and demodulated. It will be further assumed that the switch 306 outputs the four carrier signals (Pca0, Pca1, Pca2 and Pca2) 310 as received by the primary antenna. Two of the primary carrier signals (Pca1 and Pca2) are in the low band group (referenced as BG1) and two of the primary carrier signals are in the mid band group (referenced as BG2). It will also be assumed that the switch 308 is controlled to output the same four carrier signals (Dca0, Dca1, Dca2 and Dca3) 312 as received by the diversity antenna. It should be noted that switches 306 and 308 can be configured to output a different number of carriers in a different number of bands and/or groups depending on the carrier configuration to be received and demodulated.

The front end 300 comprises a printed circuit board 334 onto which is mounted the two stage LNA 336. For example, the first stage 302 comprises first stage amplification integrated circuits (IC) 314, 316 and the second stage 304 comprises second stage amplification and demodulation integrated circuit 322. The integrated circuits 314, 316, reside on the printed circuit board 334 so as to be close to their respective switches 306, 308. Thus, the signal paths from the switches 306, 308 to the integrated circuits 314, 316 can be as short as possible to reduce the chance of noise or other signal degradation. The second stage amplification and demodulation integrated circuit 322 can reside at various locations on the printed circuit board 334 to facilitate signal processing of the demodulated signals. The printed circuit board 334 comprises signal traces that route signals between the components mounted on the printed circuit board.

Each of the amplification integrated circuits 314, 316 comprises at least one band group LNA (LNA-BG$_X$). Each band group LNA operates to amplify carrier signals in a particular band or band group received from the corresponding switch output. For example, in this exemplary embodiment, the circuit 314 includes two band group LNAs (LNA-BG1 and LNA-BG2) to amplify the primary carriers in selected bands and the circuit 316 also includes two band group LNAs (LNA-BG1 and LNA-BG2) to amplify the carriers in the selected bands as received by the diversity antenna. However, the circuits 314 and 316 may comprise more band group LNAs if needed. Each band group LNA comprises two outputs to output amplified signals (shown generally at 320 and referred to as carrier groups) that are routed using signal traces of the printed circuit board 334 to the second stage LNA 304. For example, the LNA-BG1 of the IC 314 has a first output that outputs amplified primary carrier signals Pca1 and Pca3 and a second output that outputs amplified primary carrier signals Pca0 and Pca2. Likewise, the LNA-BG1 of the amplification IC 316 has a first output that outputs amplified diversity carrier signals Dca1 and Dca3 and a second output that outputs amplified diversity carrier signals Dca0 and Dca2.

The signals output from the amplification ICs 314, 316 are routed using signal traces of the printed circuit board 334 to the second stage amplification and demodulation IC 322. In an exemplary embodiment, the signals are routed so as to minimize, reduce, and/or eliminate noise that may occur when signal traces are routed across a printed circuit board. For example, the signal traces are routed so as to avoid signal trace crossings and/or closely parallel signal trace routing.

The amplification and demodulator IC 322 comprises interface low noise amplifiers (iLNA) 324, 326, 328, 330 and demodulator stages (dm1, dm2, dm3, and dm4). The signals output from the amplification ICs 314, 316 are received by the iLNAs where they are again amplified by the iLNAs to generate amplified second stage signals that are input to the demodulator stages in an efficient manner. Each demodulator stage demodulates primary and diversity carrier signals associated with a particular carrier frequency to generate primary and diversity baseband (BB) signals. The demodulated baseband signals are then output for processing by other entities at the device. Thus, in this exemplary embodiment, the two stage LNA 336 is configured as a four downlink (DL) carrier aggregation receiver.

Figure 4:
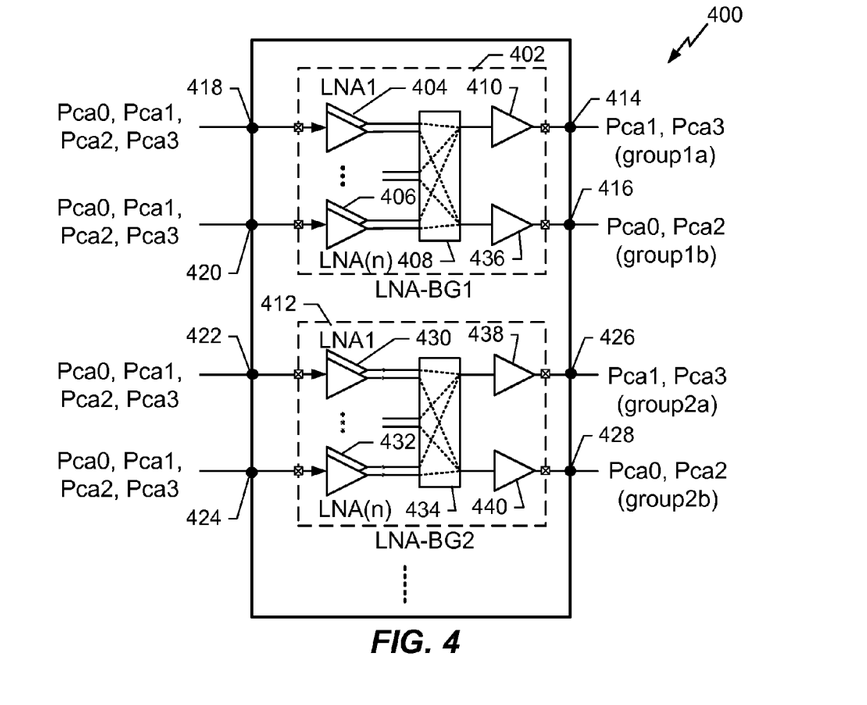
FIG. 4 shows an exemplary embodiment of a first stage amplifier.

FIG. 4 shows an exemplary embodiment of a first stage amplifier 400. For example, the first stage amplifier 400 is suitable for use as either of the first stage amplifiers 314 and 316 shown in FIG. 3. In FIG. 4 the first stage amplifier 400 is configured to operate as the first stage amplifier 314. The first stage amplifier 400 comprises a first band group LNA 402, a second band group LNA 412, and may include any number of additional band group LNAs. The band group LNA 402 comprises up to "n" LNAs to receive bands and/or carrier signals for amplification. In this exemplary embodiment, two LNAs (e.g., 404 and 406) are shown and each receives as input all or any portion of the four primary carrier signals (Pca0, Pca1, Pca2 and Pca2) 310 selected for output from the switch 306 shown in FIG. 3. It should be noted that more than two LNAs can be utilized by each band group LNA.

The first LNA 404 receives one or more of the four primary carrier signals (Pca0, Pca1, Pca2 and Pca2) 310 at an input terminal 418. The LNA 404 amplifies the received carrier signals and outputs amplified carrier signals that are input to a routing module 408. The second LNA 406 also receives one or more of the four primary carrier signals (Pca0, Pca1, Pca2 and Pca2) 310 at an input terminal 420. The LNA 406 amplifies the received carrier signals and outputs amplified carrier signals that are input to the routing module 408.

The routing module 408 routes the received amplified carrier signals such that carrier signals in a first band group are routed to a first output terminal 414. Carriers in a second band group are routed to a second output terminal 416. Thus, the first output terminal 414 outputs a first group (group 1a) of the primary carrier signals (Pca1 and Pca3) and the second output terminal 416 outputs a second group (group 1b) of the primary carriers (Pca0 and Pca2). In an exemplary embodiment, buffer amplifiers (410 and 436) are provided for amplification of the carrier signals prior to output. In an exemplary embodiment, the buffer amplifiers (410 and 436) are optional.

Similarly, the band group LNA 412 comprises up to "n" LNAs to receive carrier signals for amplification. In this exemplary embodiment, two LNAs (e.g., 430 and 432) are shown that each receives as input all or any portion of the four primary carrier signals (Pca0, Pca1, Pca2 and Pca2) 310 selected for output from the switch 306 shown in FIG. 3. It should be noted that more than two LNAs may be utilized by each band group LNA.

The first LNA 430 receives one or more of the four primary carrier signals (Pca0, Pca1, Pca2 and Pca2) 310 at an input terminal 422. The LNA 430 amplifies these carrier signals and outputs amplified carrier signals that are input to a routing module 434. The second LNA 432 also receives one or more of the four primary carrier signals (Pca0, Pca1, Pca2 and Pca3) 310 at an input terminal 424. The LNA 432 amplifies these carrier signals and outputs amplified carrier signals that are input to the routing module 434.

The routing module 434 routes the received amplified carrier signals such that carrier signals in a first band group are routed to a first output terminal 426. Carriers in a second band group are routed to a second output terminal 428. Thus, the output terminal 426 outputs a third group (group 2a) of the primary carrier signals (Pca1 and Pca3) and the output terminal 428 outputs a fourth group (group 2b) of the primary carriers (Pca0 and Pca2). In an exemplary embodiment, buffer amplifiers (438 and 440) are provided for amplification of the carrier signals prior to output. In an exemplary embodiment, the buffer amplifiers (438 and 440) are optional. The first stage amplifier 400 is also suitable for use as the first stage amplifier 316. Signals output from the first stage amplifier 400 are efficiently routed using signal traces of the printed circuit board 334 to the second stage amplifier 304. It should be noted that the routing modules 408, 434 are configured to route their respective amplified input signals to either of the two output ports. Thus, an input carrier, band or band group can be routed to either output by the operation of the routing modules 408, 434.

Figure 5:
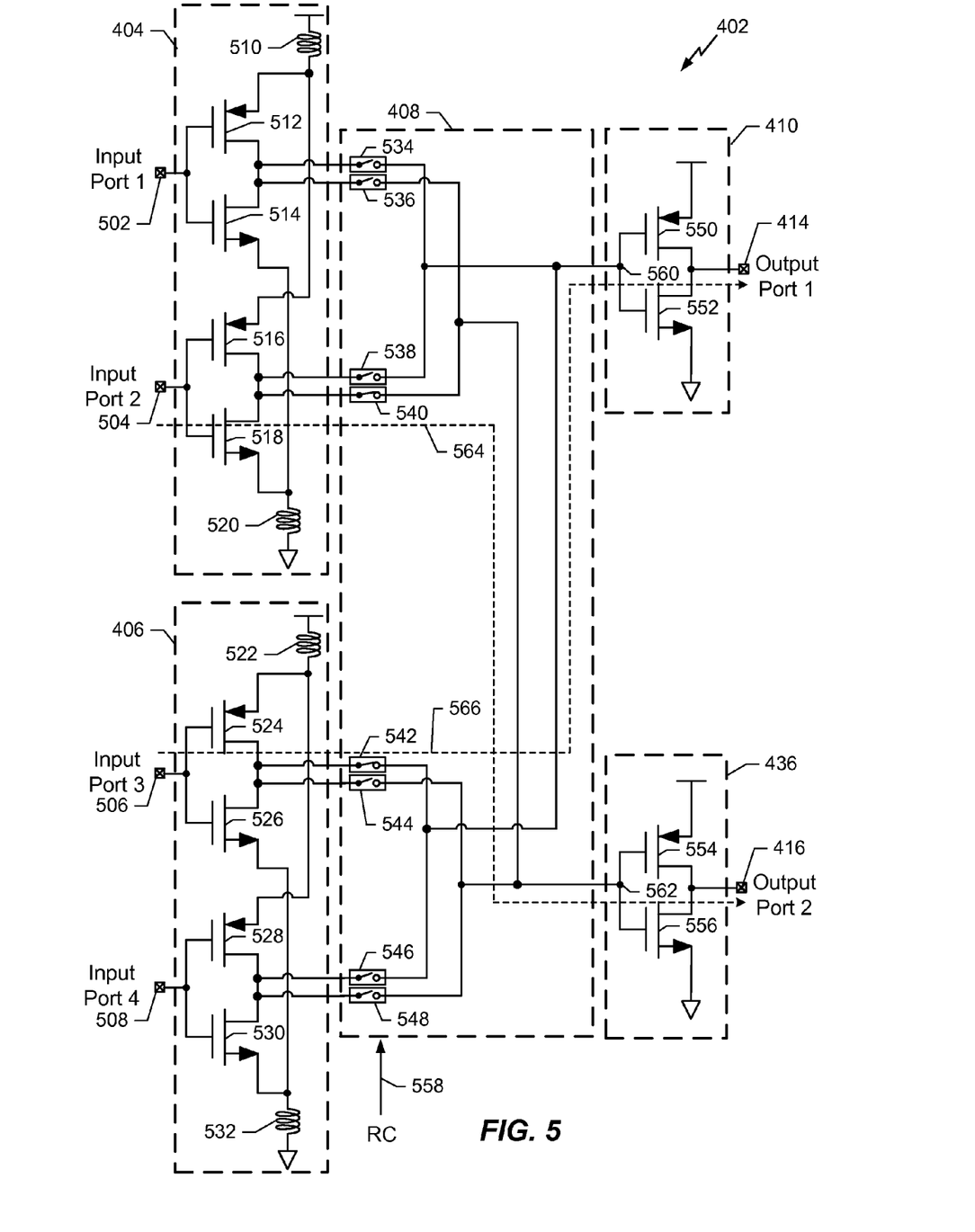
FIG. 5 shows a detailed exemplary embodiment of an LNA group shown in FIG. 4.

FIG. 5 shows a detailed exemplary embodiment of the band group LNA 402 shown in FIG. 4. In an exemplary embodiment, the band group LNA 402 comprises LNAs 404, 406, routing module 408, and buffer amplifiers 410 and 436. It should be noted that the band group LNA shown in FIG. 5 is suitable for use as any of the band group LNAs shown in FIG. 3.

The LNA 404 includes PMOS transistors 512, 516 and NMOS transistors 514 and 518. The transistor 512 has a source terminal connected to a first terminal of an inductor 510. A second terminal of the inductor 510 is connected to a power supply. An input port 502 is connected to a gate terminal of the transistors 512 and 514. The input port 502 is configured to receive one or more carrier signals. For example, the input port 502 can receive all or any portion of the four primary carrier signals (Pca0, Pca1, Pca2 and Pca3) 310. A source terminal of the transistor 514 is connected to a first terminal of inductor 520. A second terminal of the inductor 520 is connected to a signal ground.

Gate terminals of the transistors 516 and 518 are connected to a second input port 504. The input port 504 can receive all or any portion of the four primary carrier signals (Pca0, Pca1, Pca2 and Pca3) 310. A source terminal of the transistor 516 is connected to the first terminal of the inductor 510. A source terminal of the transistor 518 is connected to the first terminal of the inductor 520.

A drain terminal of the transistor 512 is connected to a drain terminal of the transistor 516 and a first terminal of switch 534 of the routing module 408. The drain terminal of the transistor 514 is connected to a first terminal of switch 536 of the routing module 408. A drain terminal of the transistor 516 is connected to a drain terminal of the transistor 518 and a first terminal of switch 538 of the routing module 408. The drain terminal of the transistor 518 is connected to a first terminal of switch 540 of the routing module 408.

The LNA 406 includes PMOS transistors 524, 528 and NMOS transistors 526 and 530. The transistor 524 has a source terminal connected to a first terminal of an inductor 522. A second terminal of the inductor 522 is connected to a power supply. An input port 506 is connected to a gate terminal of the transistors 524 and 526. The input port 506 is configured to receive one or more carrier signals. For example, the input port 506 can receive all or any portion of the four primary carrier signals (Pca0, Pca1, Pca2 and Pca3) 310. A source terminal of the transistor 526 is connected to a first terminal of inductor 532. A second terminal of the inductor 532 is connected to a signal ground.

Gate terminals of the transistors 528 and 530 are connected to a fourth input port 508. The input port 508 can receive all or any portion of the four primary carrier signals (Pca0, Pca1, Pca2 and Pca3) 310. A source terminal of the transistor 528 is connected to the first terminal of the inductor 522. A source terminal of the transistor 530 is connected to the first terminal of the inductor 532.

A drain terminal of the transistor 524 is connected to a drain terminal of the transistor 526 and a first terminal of switch 542 of the routing module 408. The drain terminal of the transistor 526 is connected to a first terminal of switch 544 of the routing module 408. A drain terminal of the transistor 528 is connected to a drain terminal of the transistor 530 and a first terminal of switch 546 of the routing module 408. The drain terminal of the transistor 530 is connected to a first terminal of switch 548 of the routing module 408.

The routing module 408 operates to route amplified versions of the signals received at the input ports (502, 504, 506, and 508) to the output buffers 410 and 436 using the switches (534, 536, 538, 540, 542, 544, 546, and 548). In an exemplary embodiment, the switches are controlled by a routing control (RC) signal 558 that controls each of the switches to be in either an open or closed state. By controlling the state of the switches, the routing module 408 operates to route any of the amplified input signals to one or both of the output buffers 410 and 436. In an exemplary embodiment, the RC signal 558 is provided by another entity at the device, such as a baseband processor.

The output buffer 410 includes transistors 550 and 552. The transistor 550 has a source terminal connected to a power supply and a drain terminal connected to a drain terminal of the transistor 552. The transistor 552 has a source terminal connected to the signal ground. The output port 414 is connected to the drain terminals of the transistors 550 and 552. The gate terminal of the transistor 550 and the gate terminal of the transistor 552 are connected at node 560. The switches 534, 538, 542, and 546 have second terminals connected to the node 560. When the switch 534 is in the closed state, its first terminal is connected to its second terminal so that signals may flow through the switch 534 to the node 560. When the switch 534 is in the open state, its first terminal is disconnected from its second terminal so that signals may not flow through the switch 534 to the node 560. The switches 538, 542 and 546 operate similarly to switch 534.

The output buffer 436 includes transistors 554 and 556. The transistor 554 has a source terminal connected to a power supply and a drain terminal connected to a drain terminal of the transistor 556. The transistor 556 has a source terminal connected to the signal ground. The output port 416 is connected to the drain terminals of the transistors 554 and 556. The gate terminal of the transistor 554 and the gate terminal of the transistor 556 are connected at node 562. The switches 536, 540, 544, and 548 have second terminals connected to the node 562. When the switch 536 is in the closed state, its first terminal is connected to its second terminal so that signals may flow through the switch 536 to the node 562. When the switch 536 is in the open state, its first terminal is disconnected from its second terminal so that signals may not flow through the switch 536 to the node 562. The switches 540, 544 and 548 operate similarly to switch 536.

In an exemplary embodiment, it will be assumed that RC signal 558 controls the switches 540, 542 to be in the closed state and controls the switches 534, 536, 538, 544, 546, and 548 to be in the open state. As a result of the selected switch states, carrier signals received at the input port 504 are amplified and routed through the switch 540 (as indicated by path 564) to the node 562 and are amplified by the buffer 436 and output at the output port 416. Carrier signals received at the input port 506 are amplified and routed through the switch 542 (as indicated by path 566) to the node 560 and are amplified by the buffer 410 and output at the output port 414. The switches in the open state prevent other signals from being routed to the output buffers 410 and 436. Thus, the band group LNA 402 is controllable to control how carrier signals present at the input ports 502, 504, 506 and 508 are amplified and routed to the output ports 414 and 416.

Figure 6:
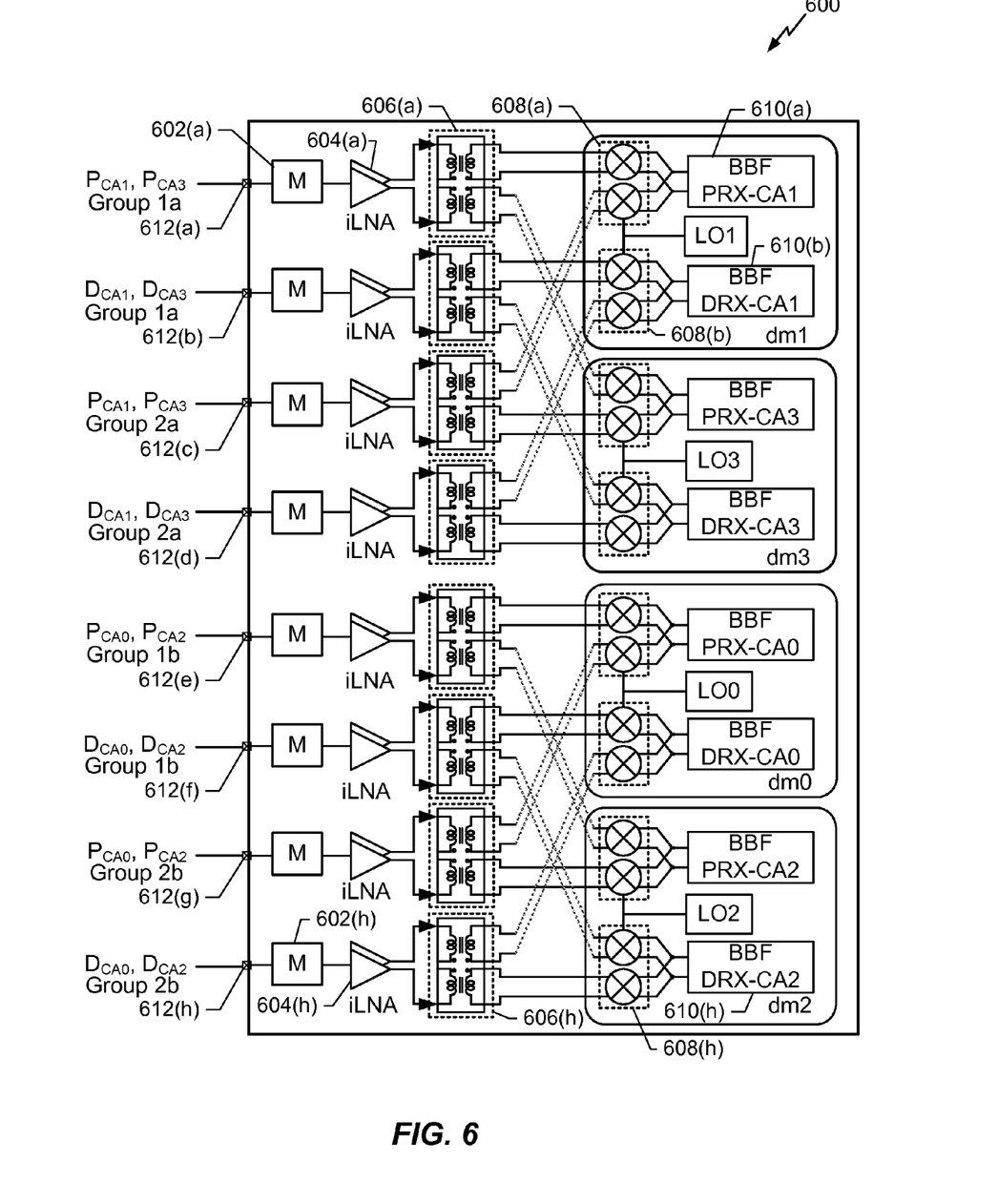
FIG. 6 shows an exemplary embodiment of an amplification and demodulation integrated circuit that includes a second stage amplifier.

FIG. 6 shows an exemplary embodiment of an amplification and demodulation IC 600. For example, the amplification and demodulation IC 600 is suitable for use as the second stage amplification and demodulation IC 322 shown in FIG. 3. In an exemplary embodiment, the IC 600 amplifies and demodulates four carrier signals from each of the primary and diversity antennas to obtain corresponding baseband signals.

In an exemplary embodiment, the IC 600 includes eight input ports 612(a-h) to receive the amplified outputs of the first stage amplifiers, such as amplifiers 314 and 316 shown in FIG. 3. For example, the amplifier 314 outputs primary groups (1a, 1b, 2a, 2b), and the amplifier 316 outputs diversity groups (1a, 1b, 2a, 2b). The amplified signals received at the input ports 612 flow to corresponding matching networks 602(a-h) that provide impedance matching to preserve signal integrity (e.g., reduce loss) and therefore signals routed from the first stage amplifiers can be routed directly by the signal traces of the printed circuit board to the input ports of the IC 600 without the use of additional matching circuits external to the IC 600.

The output ports of the matching networks 602(a-h) are connected to corresponding input ports of interface LNAs (iLNA) 604(a-h). Each iLNA amplifies the signals it receives and generates two amplified signals at two output ports. The output ports of the iLNAs 604(a-h) are connected to corresponding inputs of transformer modules 606(a-h). Each of the transformer modules 606(a-h) include two transformer circuits that perform single-end to differential conversion of the received signals to output differential signals at transformer output ports. Thus, each of the transformer modules 606(a-h) includes two single ended input ports to receive two singled ended input signals from a corresponding iLNA. Each of the transformer modules 606(a-h) includes also includes two differential output ports to output corresponding differential signals.

The transformer modules 606(a-h) convert the amplified signals output from the iLNAs 604(a-h) into differential signals while maintaining the signal characteristic of the amplified signals without loss or distortion and while providing additional out-of-band rejection. The transformer modules 606(*a-h*) output the differential signals for input to the demodulator stages (dm0, dm1, dm2, dm3) In an exemplary embodiment, the two differential outputs of each transformer module 606(*a-h*) are routed to different demodulator stages. For example, the two differential outputs of transformer module 606(*a*) are routed to the demodulator stages dm1 and dm3.

The demodulator stages (dm0, dm1, dm2, dm3) include mixer modules 608(*a-h*). Each of the mixer modules 608 (*a-h*) include two double balanced mixer circuits to demodulate two carrier signals. For example, the demodulator stage dm1 includes mixer modules 608(*a*) and 608(*b*) and each of these mixer modules include two double balanced mixer circuits with each mixer circuit demodulating a received differential input signal using the local oscillator (e.g., LO1). Thus, the differential carrier signals received by each demodulator stage are demodulated using the same LO signal. For example, the first mixer circuit of the mixer module 608(*a*) receives the primary carrier Pca1 that is received at the input port 612(*a*) and the second mixer circuit of the mixer module 608(*a*) receives the primary carrier Pca1 that is received at the input port 612(*c*). Likewise, the first mixer circuit of the mixer module 608(*b*) receives the diversity carrier Dca1 that is received at the input port 612(*b*) and the second mixer circuit of the mixer module 608(*b*) receives the diversity carrier Dca1 that is received at the input port 612(*d*). The mixer modules 608(*a*) and 608(*b*) demodulate the carrier signals Pca1 and Dca1 using the same oscillator signal generated by the LO1 circuit. The demodulated signals, which are baseband signals are input to baseband filters 610(*a*) and 610(*b*) of baseband filters 610(*a-h*). The other demodulator stages (dm1, dm2, dm3) operate similarly to the first demodulator stage (dm1) to demodulate the primary and diversity carrier signals CA0, CA2, and CA3 received from the primary and diversity antennas to obtain the corresponding baseband signals. Thus, each demodulator stage demodulates carrier signals in a selected band group.

Thus, the carrier signals, bands and/or band groups that are selected and output from the switches 306, 308 are input to the first stage amplifiers 314, 316. The first stage amplifiers 314, 316 amplify the signals at their inputs and output amplified carrier groups to the second stage amplification and demodulation stage 304. The groups are efficiently routed between the first 302 and second stage 304 using signal traces of the printed circuit board 334. The iLNAs amplify the carrier groups they receive and distribute the amplified carrier groups to the appropriate demodulator stages. Each demodulator stage uses one LO to demodulate selected carriers it receives. The demodulated baseband signals are then output to baseband processing entities at the device.

Figure 7:
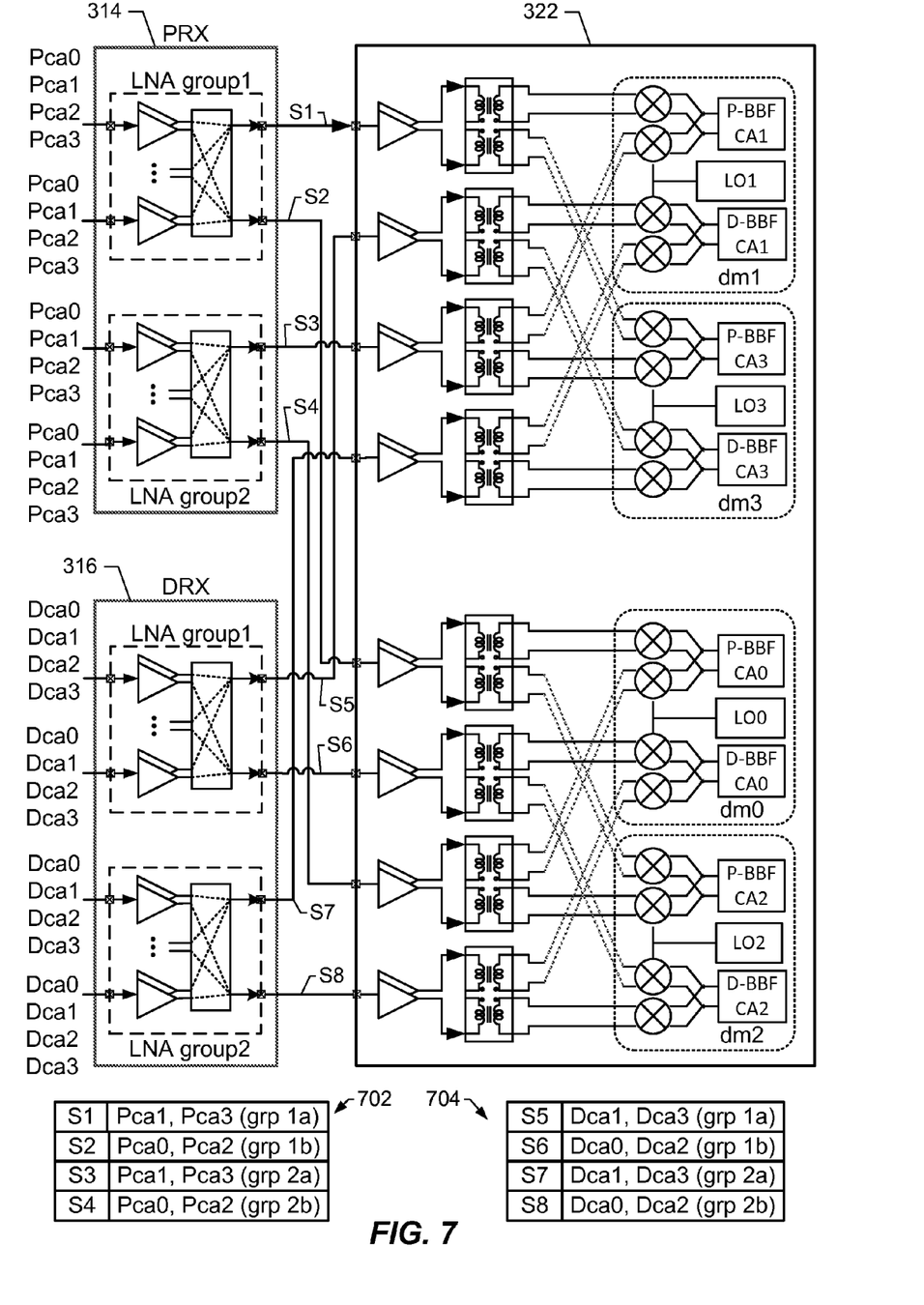
FIG. 7 shows a detailed exemplary embodiment of the two stage LNA shown in FIG. 3.

FIG. 7 shows a detailed exemplary embodiment of the two stage LNA 336 shown in FIG. 3. The components of the two stage LNA are mounted on the printed circuit board 334. In this embodiment, the amplification ICs 314 and 316 of the first stage 302 comprise an embodiment of the dual amplifier 400 shown in FIG. 4. The single demodulator IC 322 of the second stage 304 comprises an embodiment of the demodulator IC 600 shown in FIG. 6. Amplified carrier signals output from the first stage 302 are routed to the second stage 304 for amplification and demodulation to generate the corresponding baseband signals. Tables 702 and 704 identify the carrier signals output from the amplification ICs 314 and 316. Thus, the embodiment shown in FIG. 7 forms a 4 downlink carrier aggregation receiver. It should be noted that the system is scalable and expandable to process more than 4 downlink carriers.

Figure 8:
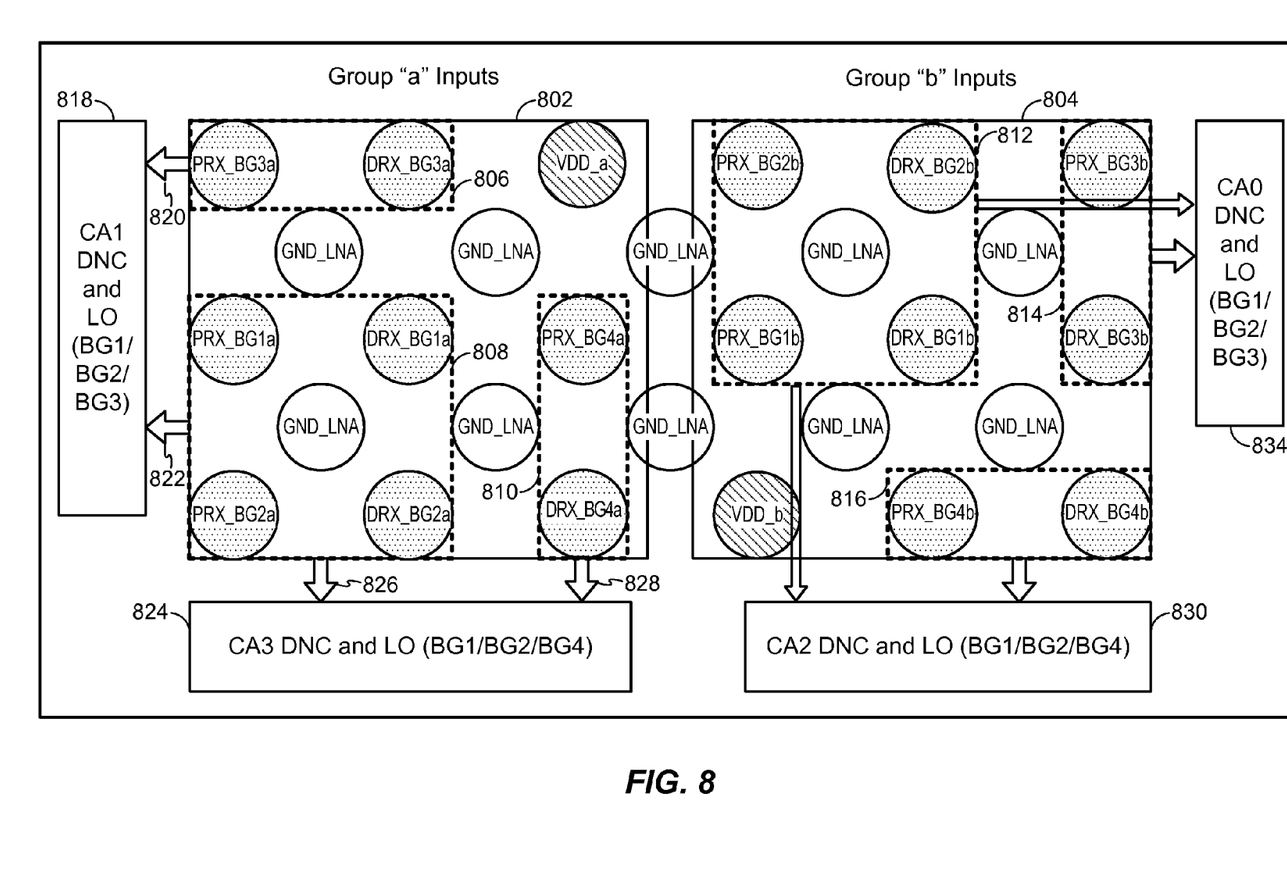
FIG. 8 shows an exemplary embodiment of interface pins of the integrated circuit shown in FIG. 6.

FIG. 8 shows an exemplary embodiment of an interface pin arrangement for the IC 600 shown in FIG. 6. In an exemplary embodiment, the arrangement of the interface pins reduces the length and routing complexity of circuit traces between the iLNA 604 outputs to their respective mixer groups 608. In an exemplary embodiment, the interface pins can be divided into group "a" 802 and group "b" 804. In an exemplary embodiment, the interface pins in group "a" 802 comprises pin sub-groups 806, 808 and 810. In an exemplary embodiment, the pins in pin sub-group 806 comprise pins for the third primary band group (PRX_BG3*a*) and diversity band group (DRX_BG3*a*). The pins in pin sub-group 808 comprise pins for the primary band group (PRX_BG1*a*), primary band group (PRX_BG2*a*), diversity band group (DRX_BG1*a*), and diversity band group (DRX_BG2*a*). The pins in pin sub-group 810 comprise pins for the primary band group (PRX_BG4*a*) and diversity band group (DRX_BG4*a*). The pin group 802 also includes pins for power (VDD_a) and ground (GND_LNA). In an exemplary embodiment, BG1*a* comprises carriers in a high band, BG2*a* comprises carriers in a mid band, BG3*a* comprises carries in a low band, and BG4*a* comprises carriers in an ultra high band.

In an exemplary embodiment, the interface pins in group "b" 804 comprise pin sub-groups 812, 814 and 816. In an exemplary embodiment, the pins in pin sub-group 812 comprise pins for the primary band groups (PRX_BG1*b*) and (PRX_BG2*b*), diversity band groups (DRX_BG1*b*) and (DRX_BG2*b*). The pins in pin sub-group 814 comprise pins for the primary band group (PRX_BG3*b*) and diversity band group (DRX_BG3*b*). The pins in pin sub-group 816 comprise pins for the primary band group (PRX_BG4*b*) and diversity band group (DRX_BG4*b*). The pin group 804 also includes pins for power (VDD_b) and ground (GND_LNA). In an exemplary embodiment, BG1*b* comprises carriers in a high/ultra high band, BG2*b* comprises carriers in a high band, BG3*b* comprises carries in an LTEU band, and BG4*b* comprises carriers in a low/mid band.

In an exemplary embodiment, a CA1 demodulator stage 818 is located near the pin sub-groups 806 and 808 so as to reduce routing complexity from the pin sub-groups 806 and 808 to the CA1 demodulator stage 818 (e.g., dm1 shown in FIG. 6). Similarly, a CA3 demodulator stage 824 is located near the pin sub-groups 808 and 810 so as to reduce routing complexity from the pin sub-groups 808 and 810 to the CA3 demodulator stage 824 (e g, dm3 shown in FIG. 6). In an exemplary embodiment, a CA0 demodulator stage 834 is located near the pin sub-groups 812 and 814 so as to reduce routing complexity from the pin sub-groups 812 and 814 to the CA0 demodulator stage 834 (e.g., dm0 shown in FIG. 6). In an exemplary embodiment, a CA2 demodulator stage 830 is located near the pin sub-groups 812 and 816 so as to reduce routing complexity from the pin sub-groups 812 and 816 to the CA2 demodulator stage 830 (e.g., dm2 shown in FIG. 6).

By arranging the CA1 demodulator stage 818, CA3 demodulator stage 824, CA0 demodulator stage 834 and CA2 demodulator stage 830 around a periphery of the group "a" pins 802 and the group "b" pins 804, and close to the pin sub-groups to which they are coupled, it is possible to obtain substantially orthogonal signal routing such that signal lines between the pin sub-groups and the demodulator stages generally do not cross each other and when they do cross, they generally cross substantially orthogonally, thus minimizing signal coupling between the connections.

For example, in an exemplary embodiment, the lines 820 from the pin sub-group 806 can be routed away from the lines 822 from the pin sub-group 808. Similarly, the lines 826 from the pin sub-group 808 can be routed away from the lines 828 of the pin sub-group 810.

In an exemplary embodiment, the lines 820 and the lines 822 are routed substantially orthogonally with respect to the lines 826 and 828. Similar routing arrangements can be accomplished with respect to the group "b" pins 804.

Exemplary embodiments of the structure shown herein also promote efficient area utilization for complex receivers with a large number of inputs. Multiple sub-groups can be constructed and their placements can be carrier-centric (CA-centric) to further reduce signal coupling across signal lines. CA-centric means that the pins are arranged near to the demodulator stages in accordance with the carriers they are associated with in order to reduce routing complexity and potential signal distortions.

In an exemplary embodiment, each interface iLNA 604 only couples to two demodulators of two dm groups, such that connection pins for a four down-link CA receiver can be split into the two pin-groups "a" 802 and "b" 804. In this exemplary embodiment, no RF signal crossing occurs between the two pin-groups "a" 802 and "b" 804, thus signal isolation between pin groups can be maximized.

In an exemplary embodiment, pin placement are made CA-centric whenever possible, For example, CA-centric pin sub-groups 806, 808 and 810 in pin group "a" 802 are arranged such that primary and diversity LNA inputs are grouped together. For example, pin sub-group 806 only connects to the CA1 demodulator stage 818 and are placed near the CA1 demodulator stage 818. Pin sub-group 810 inputs only connect to the CA3 demodulator stage 824 and are placed near CA3 demodulator stage 824. Pin sub-group 808 pins connects to both the CA1 demodulator stage 818 and the CA3 demodulator stage 824 and are placed near both the CA1 demodulator stage 818 and the CA3 demodulator stage 824. In this exemplary embodiment, LB, MB, HB, and LTEU bands are supported by CA1 and CA3. Signal routing between CA1 and CA3 are orthogonal. Similar pin-group arrangements are made with respect to group "b" 804 pins groups.

In an exemplary embodiment, CA-centric pin sub-groups 812, 814 and 816 in pin group "b" 804 are arranged such that primary and diversity LNA inputs are grouped together. For example, pin subgroup 814 inputs only connect to CA0 demodulator stage 834 and are placed near CA0 demodulator stage 834. Pin sub-group 816 inputs only connect to CA2 demodulator stage 830 and are placed near CA2 demodulator stage 830. Pin sub-group 812 inputs go to both CA0 demodulator stage 834 and CA2 demodulator stage 834, and are placed near both the CA0 demodulator stage 834 and the CA2 demodulator stage 830. In this exemplary embodiment, LB, MB, HB, UHB, and LTEU bands are supported by CA0 and CA2. Signal routing between CA0 and CA2 are orthogonal. Because only CA2 in pin group "b" 804 supports LB and MB, their inputs can be multiplexed together.

Figure 9:
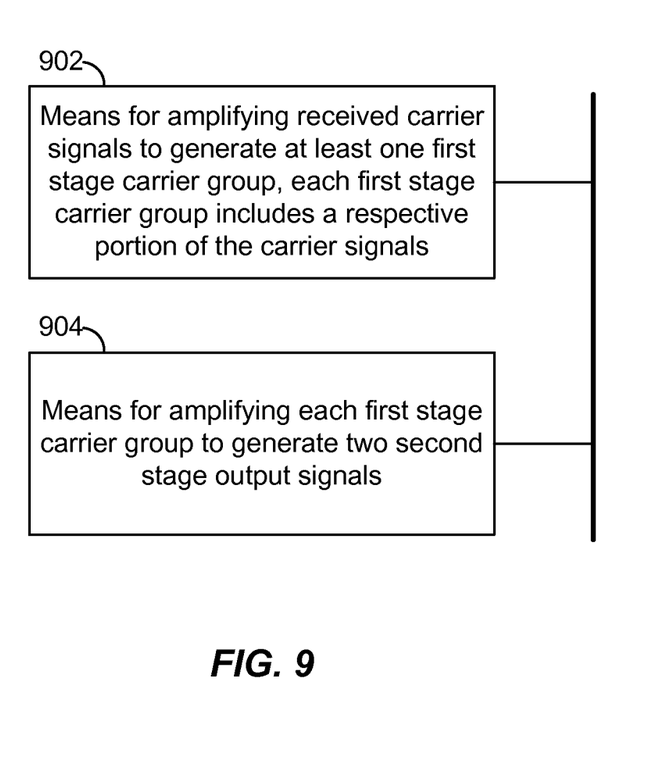
FIG. 9 shows an exemplary embodiment of a two stage LNA apparatus.

FIG. 9 shows an exemplary embodiment of two stage receiver apparatus 900. In an exemplary embodiment, the apparatus 900 is suitable for use as the two stage receiver 300 shown in FIG. 3.

The apparatus 900 includes a first means (902) for amplifying received carrier signals to generate at least one first stage carrier group, each first stage carrier group includes a respective portion of the carrier signals, which in an exemplary embodiment comprises the first stage amplification 302. The apparatus 900 also comprises a second means (904) for amplifying each first stage carrier group to generate two second stage output signals, which in an exemplary embodiment comprises the second stage amplification 304.

The exemplary embodiments described herein may be implemented on an IC, an analog IC, an RFIC, a mixed-signal IC, an ASIC, a printed circuit board (PCB), an electronic device, etc. The exemplary embodiments may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing an exemplary embodiment described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but the disclose is to be accorded the widest scope consistent with the principles and novel features disclosed herein.

What is claimed is:

1. An apparatus comprising:
   at least one first stage amplifier configured to amplify received carrier signals to generate at least one first stage carrier group, each first stage carrier group including a respective portion of the carrier signals; and
   second stage amplifiers configured to amplify the at least one first stage carrier group, each second stage amplifier configured to amplify a respective first stage carrier group to generate second stage output signals, wherein a first output of a first amplifier of the second stage amplifiers is coupled to an input of a first demodulator, and wherein a second output of the first amplifier of the second stage amplifiers is coupled to an input of a second demodulator.

2. The apparatus of claim 1, wherein the first demodulator is configured to demodulate a first selected carrier signal, wherein the second demodulator is configured to demodulate a second selected carrier signal.

3. The apparatus of claim 1, the received carrier signals comprising primary and diversity carrier signals.

4. An apparatus comprising:
   at least one first stage amplifier configured to amplify received carrier signals to generate at least one first stage carrier group, the at least one first stage amplifier comprising:
      at least one first low noise amplifier (LNA) configured to amplify the received carrier signals to generate a first amplified output having a first portion of the carrier signals and to generate a second amplified output having a second portion of the carrier signals;

at least one second low noise amplifier (LNA) configured to amplify the received carrier signals and to generate a third amplified output having the first portion of the carrier signals and to generate a fourth amplified output having the second portion of the carrier signals; and a routing module configured to route at least one of the first, second, third, and fourth amplified outputs to a first output port and to route at least one of the first, second, third, and fourth amplified outputs to a second output port; and second stage amplifiers configured to amplify the at least one first stage carrier group, each second stage amplifier configured to amplify a respective first stage carrier group to generate second stage output signals.

5. The apparatus of claim 1, the at least one first stage carrier group including single ended signals.

6. The apparatus of claim 2, the second stage amplifiers comprising interface amplifiers, each interface amplifier comprising at least one low noise amplifier configured to amplify a selected first stage carrier group to generate a second stage amplified output having a first selected amplified carrier signal and a second selected amplified carrier signal.

7. The apparatus of claim 6, further comprising matching circuits configured to match the at least one first stage carrier group to the interface amplifiers.

8. The apparatus of claim 6, further comprising transformer modules configured to convert the first and second selected amplified carrier signals to differential signals.

9. The apparatus of claim 8, the first demodulator comprising mixers configured to receive the differential signals and to convert the differential signals to baseband signals based on a local oscillator.

10. The apparatus of claim 9, the mixers configured as double balanced mixers.

11. The apparatus of claim 1, the at least one first stage amplifier disposed on one or more integrated circuits and the second stage amplifiers disposed on a separate single integrated circuit.

12. The apparatus of claim 11, wherein the one or more integrated circuits and the separate single integrated circuit are disposed on a printed circuit board.

13. The apparatus of claim 12, the printed circuit board comprising signal traces configured to route the at least one first stage carrier group to the separate single integrated circuit.

14. The apparatus of claim 13, the separate single integrated circuit comprising interface pins connected to the signal traces of the printed circuit board.

15. The apparatus of claim 14, the interface pins of the separate single integrated circuit arranged in a carrier-centric arrangement, wherein selected interface pins associated with an output of each second stage amplifier are positioned proximate to a respective demodulator to isolate signal traces connected to the demodulator, and wherein signal traces connected to different demodulators cross orthogonally.

16. An apparatus comprising:
means for amplifying received carrier signals to generate at least one first stage carrier group, each first stage carrier group including a respective portion of the carrier signals; and
means for amplifying the at least one first stage carrier group to generate second stage output signals, wherein a first output of the means for amplifying the at least one first stage carrier group is coupled to an input of means for demodulating at least a first one of the second stage output signals, and wherein a second output of the means for amplifying the at least one first stage carrier group is coupled to an input of means for demodulating at least a second one of the second stage output signals.

17. The apparatus of claim 16, wherein the means for demodulating at least the first one of the second stage output signals is configured to demodulate a first selected carrier signal, wherein the means for demodulating at least the second one of the second stage output signals is configured to demodulate a second selected carrier signal.

18. The apparatus of claim 16, the means for amplifying the received carrier signals comprising:
means for generating a first amplified output having a first portion of the carrier signals, a second amplified output having a second portion of the carrier signals, a third amplified output having a third portion of the carrier signals, and a fourth amplified output having a fourth portion of the carrier signals; and
means for routing a first selected one of the first, second, third and fourth amplified outputs to a first output port and for routing a second selected one of the first, second, third, and fourth amplified outputs to a second output port.

19. The apparatus of claim 17, further comprising means for converting the second stage output signals to differential signals.

20. The apparatus of claim 19, the means for demodulating at least the first one of the second stage output signals comprising means for mixing configured to receive the differential signals and to convert the differential signals to baseband signals based on a local oscillator.

* * * * *